(12) United States Patent
Loder

(10) Patent No.: US 11,955,754 B2
(45) Date of Patent: Apr. 9, 2024

(54) CONDUCTOR FOR VEHICLE SYSTEMS

(71) Applicant: Rolls-Royce Corporation, Indianapolis, IN (US)

(72) Inventor: David Loder, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 656 days.

(21) Appl. No.: 16/803,408

(22) Filed: Feb. 27, 2020

(65) Prior Publication Data

US 2021/0273382 A1 Sep. 2, 2021

(51) Int. Cl.
*H01R 13/6592* (2011.01)
*H01B 7/30* (2006.01)
*H01B 9/02* (2006.01)
*H01R 13/187* (2006.01)

(52) U.S. Cl.
CPC ......... *H01R 13/6592* (2013.01); *H01B 9/027* (2013.01); *H01R 13/187* (2013.01); *B64D 2221/00* (2013.01); *H01B 7/303* (2013.01)

(58) Field of Classification Search
CPC ............ H01R 13/6592; H01R 13/6598; H01R 13/6591; H01R 13/65912–65918; H01R 13/187; H01R 13/658; H01R 13/646
See application file for complete search history.

(56) References Cited

U.S. PATENT DOCUMENTS

| | | | | |
|---|---|---|---|---|
| 3,396,231 A * | 8/1968 | Anderson | ............... | H01B 9/027 324/544 |
| 3,396,291 A * | 8/1968 | Somerville | ............ | H02K 19/24 310/263 |
| 3,644,662 A * | 2/1972 | Salahshourian | ..... | H02G 15/068 174/73.1 |
| 6,397,454 B1 * | 6/2002 | Seuntjens | ............ | H10N 60/203 505/231 |
| 6,398,702 B1 * | 6/2002 | Schlafer | ............. | G03G 15/0818 29/895.32 |
| 9,193,311 B2 | 11/2015 | Siegel et al. | | |
| 10,703,496 B2 * | 7/2020 | Vondrell | ................. | F02C 6/206 |
| 11,121,557 B2 * | 9/2021 | Cottrell | ................. | B64D 47/00 |
| 11,348,705 B2 * | 5/2022 | Costello | ................... | H01B 3/20 |
| 2008/0190637 A1 * | 8/2008 | Folts | ....................... | H01L 39/16 174/15.6 |
| 2014/0190741 A1 * | 7/2014 | Hayakawa | .......... | B60R 16/0215 174/72 A |

(Continued)

OTHER PUBLICATIONS

Product Data Sheet—Polyethylene Visico LE0542—Silane Crosslinkable Semiconductive Compound, Jul. 10, 2018 Ed.3, 3 pgs.

(Continued)

*Primary Examiner* — Oscar C Jimenez
(74) *Attorney, Agent, or Firm* — Shumaker & Sieffert, P.A.

(57) ABSTRACT

In examples of the disclosure, a device may be couple an electrical load to a power source. The device may have a first coupling configured to couple to the power source and a second coupling configured to couple to the electrical load. The device may have a plurality of strands electrically disposed between the first coupling and the second coupling. Each of the plurality of strands may have a coating having a resistivity greater than $1.8 \times 10^{-8}$ Ω-m and less than 1 Ω-m and a center conductor wrapped, at least in part, by the coating.

20 Claims, 8 Drawing Sheets

(56) References Cited

U.S. PATENT DOCUMENTS

2016/0307666 A1* 10/2016 Kamidaki ............ H01F 27/2823
2017/0287595 A1* 10/2017 Holzmueller ........ H01B 7/2813
2019/0103703 A1*  4/2019 Yaroslavskiy ......... H01B 7/282
2020/0203040 A1*  6/2020 Wu .................... H01B 11/1066

OTHER PUBLICATIONS

Product Data Sheet—Polyethylene Borlink LE4201R—Crosslinkable Insulation Compound, Oct. 2, 2017 Ed.2, 3 pgs.
New England Wire Technologies—Litz Wire, Apr. 5, 2003, 6 pgs.
Semi/Con—Semi-Conductive Silicone Rubber, Retrieved from https://www.teledynedefenseelectronics.com/ on Dec. 9, 2019, 3 pgs.
Tang et al., "Stranded Wire with Uninsulated Strands as a Low-Cost Alternative to Litz Wire", IEEE Power Electronics Specialists Conference, Jun. 2003, pp. 289-295, 8 pgs.
Liz Wire: Film Insulations | New England Wire Technologies, Retrieved from https://www.newenglandwire.com/litz-wire-film-insulations/ on Dec. 9, 2019, 7 pgs.

\* cited by examiner

CONDUCTOR FOR VEHICLE SYSTEMS

BACKGROUND

Vehicle and systems for supplying electrical power to vehicle electrical loads remain an area of interest. Electrical power equipment for vehicles are transitioning to higher voltages and higher frequencies to reduce the weight of power distribution and conversion devices (e.g., electrical cables, electrical motors/generators, transformers, etc.) as higher frequencies may reduce sizes of electrical components driving the power distribution and conversion devices. Similarly, electrical vehicles may prefer reduced weight to extend battery durations as less power may be expended to move electrical vehicles of reduced weight. As such, electrical motors and generators may be made smaller and lighter when operating at higher frequencies (e.g., smaller items may spin faster, and thereby produce more revolutions per second resulting in higher frequencies).

However, delivering high voltages at high frequencies may be challenging, especially in low air pressure and/or harsh environments (such as changing temperatures throughout the year in some climates), which is common in aerospace and other transportation industries. Air is an electrical insulator. The greater the altitude, the lower the air pressure and thus less air present to act as an electrical insulator, thereby decreasing the insulation. As a result, the electrical power equipment and distribution systems may experience issues when attempting to distribute power at high voltages and frequencies in these varying (e.g., in terms of insulation) conditions. Delivering high voltages may become even more problematic when the frequencies are increased as certain properties of conductors may restrict how much electricity is conveyed throughout the interior of the conductors.

SUMMARY

In general, various aspects of the techniques described in this disclosure are directed to a conductor which may operate efficiently at high voltages and high frequencies. The disclosed conductor may enable efficient operation in environments having varying conditions such as high altitudes or other harsh environments in which the natural insulation provided by air is reduced. In this respect, deleterious effects, such as skin effect (which grows in concern as frequency is increased) and E-field stress (electric field stress, which grows in concern as voltage increases), become greater obstacles to moving electricity from one point to another at high voltages and high frequencies. As aircraft or other vehicles (such as vehicles powered by electrical storage components, e.g., batteries) are designed to become lighter, the power electronics onboard are made lighter through adaptation to higher frequencies. However, these higher frequencies may be difficult to use at higher voltages. Thus, in aspects of the present disclosure a stranded conductor is discussed which may provide high voltages at high frequencies.

Utilizing higher frequencies allows for the use of smaller electrical equipment and systems aboard a vehicle. Smaller electrical equipment and systems aboard a vehicle make the vehicle lighter. In determining vehicle efficiency, vehicle weight plays a large part of the vehicle's efficiency (e.g., the heavier the vehicle, the more energy it will take to propel the vehicle along). Examples of the present disclosure may be directed to a conductor which allows for voltages to be efficiently moved along the conductor at high frequencies. A conductor efficiently moving high voltages (e.g., above 270V) from a power source to an electrical load at a high frequency (e.g., up to 10 MHz). The above conductor may have a resistance factor (i.e., (resistance at alternating current (AC))/(resistance at direct current (DC))) at or substantially near 1 for frequencies up to 10 MHz. The conductor may operate at voltages at or above 270 volts. The above conductor may be resistive to E-field stress through a semi-conductive coating at least partially covering a conductor allowing voltages of 270 volts and greater at frequencies up to 10 MHz. The above conductor may mitigate skin effect (i.e., maintaining skin depth ranges between 10 m and 0.1 mm) of the conductor at frequencies up to 10 MHz.

In examples of the disclosure, a device may couple an electrical load to a power source. The device may have a first coupling configured to couple to the power source and a second coupling configured to couple to the electrical load. The device may have a plurality of strands electrically disposed between the first coupling and the second coupling. Each of the plurality of strands may have a coating having a resistivity greater than $1.8 \times 10^{-8}$ ohms per meter ($\Omega$-m) and less than 1 $\Omega$-m and a center conductor wrapped, at least in part, by the coating.

In examples of the disclosure, a system for supplying power to an electrical vehicle load during vehicle operations of a vehicle may have an engine mounted in or on the vehicle. A power source may be coupled to the engine and configured to generate electrical power at a voltage above 270 volts for the vehicle electrical load during operations of the vehicle. A first coupling may be coupled to the power source. A second coupling may be configured to couple to the vehicle electrical load. A plurality of strands may be electrically disposed between the first coupling and the second coupling. Each of the plurality of strands may include a coating having a resistivity greater than $1.8 \times 10^{-8}$ ohms per meter ($\Omega$-m) and less than 1 $\Omega$-m and a center conductor wrapped, at least in part, by the coating.

In examples of the disclosure, an aircraft may have a wing, a fuselage coupled to the wing, an engine coupled to at least one of the fuselage and the wing, an electrical load of a high energy device associated with the aircraft during flight operations, and a power source coupled to the engine and configured to generate electrical power at a voltage above 270 volts for the electrical load of the high energy device during flight operations. A first coupling may be configured to couple to the power source. A second coupling may be configured to couple to the aircraft electrical load. A plurality of strands may be electrically disposed between the first coupling and the second coupling. Each of the plurality of strands may include a coating having a resistivity greater than $1.8 \times 10^{-8}$ ohms per meter ($\Omega$-m) and less than 1 $\Omega$-m and a center conductor wrapped, at least in part, by the coating.

The details of one or more examples are set forth in the accompanying drawings and the description below. Other features, objects, and advantages will be apparent from the description and drawings, and from the claims.

BRIEF DESCRIPTION OF DRAWINGS

Like reference numerals in the figures indicate like elements.

DETAILED DESCRIPTION

Figure 1:
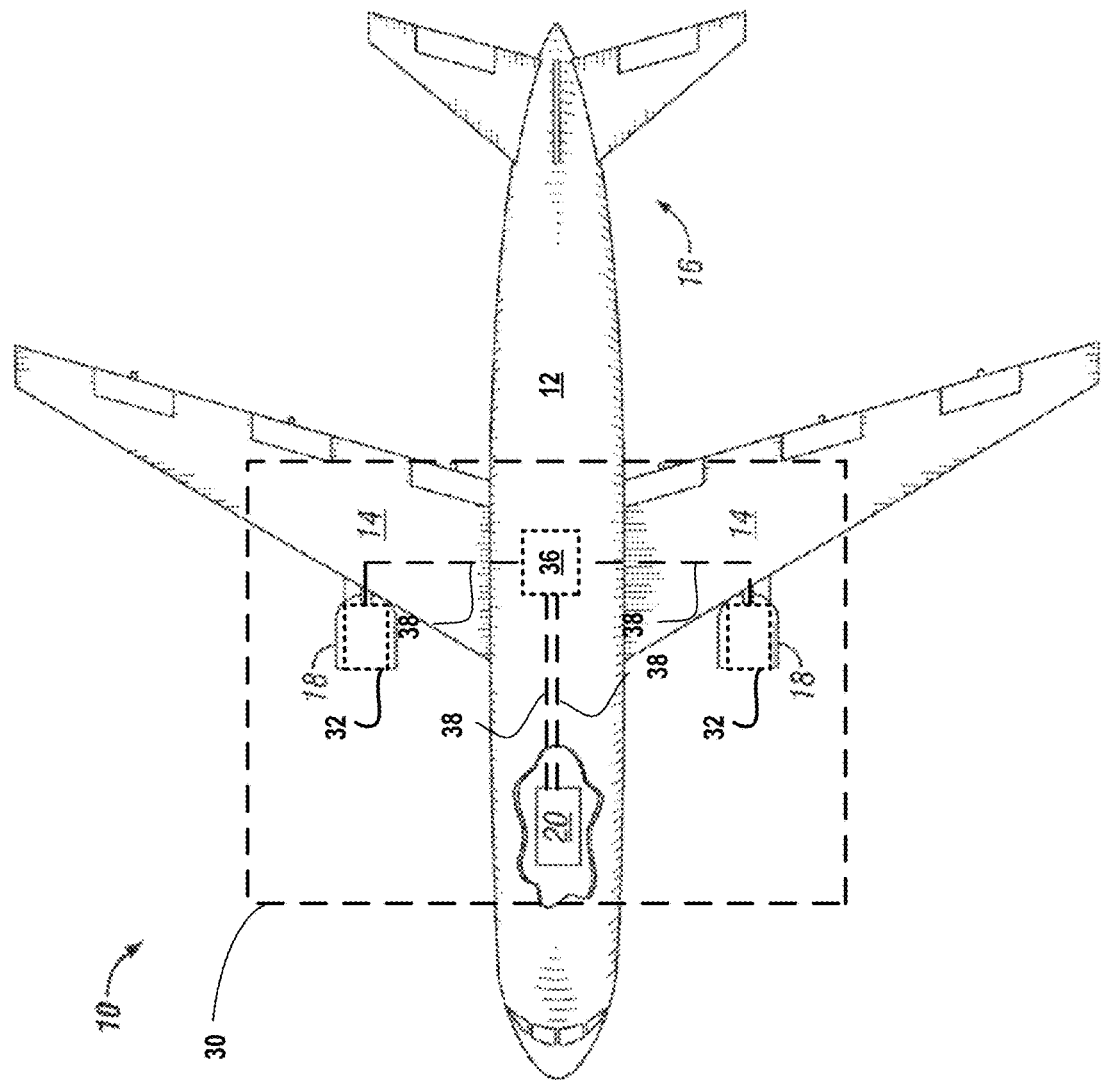
FIG. 1 is a block diagram illustrating a vehicle including conductor devices configured in accordance with aspects of the techniques described in this disclosure.

FIG. 1 is a block diagram illustrating a vehicle 10 including conductor devices 38 configured in accordance with aspects of the techniques described in this disclosure. In one form, vehicle 10 is an aircraft, referred to herein as aircraft 10. Aircraft 10 includes a fuselage 12, wings 14, an empennage 16, propulsion engines 18, an aircraft and a power system 30 including electrical load 20, a power source (e.g., a generator) 32, voltage reducer 36 and conductor device 38.

Aircraft 10 may be a fixed-wing aircraft. Aircraft 10 may be any type of aircraft (e.g., including and without limitation, a rotary-wing aircraft, a combination rotary-wing/fixed-wing aircraft, a tilt-rotor aircraft, and/or a tilt-wing aircraft) and may be manned or autonomous. Aircraft 10 may have a single main propulsion engine or a plurality of main propulsion engines. In addition, aircraft 10 may employ any number of wings 14. Empennage 16 may include a single flight control surface or multiple flight control surfaces.

In power system 30, electrical load 20 may be a high energy device associated with aircraft 10 during flight operations and may be coupled to power source 32 (e.g., a generator). Power source 32 may generate electrical power at a voltage above 270 volts for electrical load 20. Conductor device 38 may couple power source 32 to aircraft electrical load 20 with high voltage couplings.

Aircraft 10 may have wings 14 and empennage 16 are coupled to fuselage 12. Aircraft 10 may be a twin-engine aircraft and engines 18 may be turbofan engines. Engines 18 may be turboprop engines, turboshaft engines, turbojet engines, hybrid engines or any other type of engine. Engines 18 may be coupled to wings 14. Engines 18 may be coupled to any one or more aircraft 10 structures, e.g., including fuselage 12 and/or empennage 16. Further, aircraft 10 may be any type of vehicle including an electric car, electric truck, tank, electric tractor trailer, ship, submarine, farm equipment, construction equipment, or an unmanned aerial vehicle.

Power system 30, may have an electrical load 20 associated with aircraft 10 during flight operations. Electrical load 20 may include one or more high energy devices, such as directed energy weapon systems (e.g., a high-power laser system, a high-power microwave system, electrical propulsion units and/or a high-power millimeter wave system). Electrical load 20 may be any electrical load associated with aircraft 10 (e.g., including flight computer systems, naviga-tion and communication systems, radar systems and other hazard detection/avoidance systems, flight control surface positioning systems, landing gear systems, cabin environmental control systems, or any electrical system employed by aircraft 10 during flight operations). High energy devices requiring high voltage and/or high frequencies may be affected by e-field stress and skin effect.

Delivering high voltages at high frequencies may be challenging, especially in low air pressure and/or harsh environments, which is common in aerospace and other transportation industries. Air is an electrical insulator. However, the greater the altitude, air density decreases and thus less air present to act as an electrical insulator, thereby decreasing the electrical insulation. As a result, the electrical power equipment and distribution systems may experience issues when attempting to distribute power at high voltages and frequencies in these conditions.

Delivering high voltages may become even more problematic when the frequencies are increased as certain properties of conductors may restrict how much electricity is conveyed throughout the interior of the conductors. To address these issues, examples of the present disclosure address an aircraft 10 transferring high-voltage high-frequency electrical energy from power source 32 via conductor device(s) 38. In examples of the present description, conductor device(s) 38 may transfer electrical power from power source 32 to load 20 at voltages exceeding 270V at frequencies up to 10 MHz with little deleterious effects from skin effect (i.e., the tendency of an alternating electric current (AC) to become distributed within a conductor so the current density is largest near the surface of the conductor and decreases with greater depths in the conductor) and/or e-field stress (i.e., the stress endured by insulator materials when exposed to high voltage electrical fields). Skin effect causes the effective resistance of a conductor to increase at higher frequencies where the skin depth becomes smaller, thus reducing the effective cross-section of the conductor. Power system 30 addresses the issues of skin effect and e-field stress.

To overcome these issues related to high voltage and high frequency conduction, techniques described in this disclosure are directed to conductor device(s) 38 which may operate efficiently at high voltages and high frequencies. The disclosed conductor device(s) 38 may enable efficient operation in environments having varying conditions such as high altitudes or other harsh environments in which the natural insulation provided by air is reduced. In this respect, deleterious effects, such as skin effect (which grows in concern as frequency is increased) and E-field stress become greater obstacles to moving electricity from one point to another at high voltages and high frequencies. As aircraft 10 or other vehicles are designed to become lighter, the power electronics onboard are made lighter through adaptation to higher frequencies. However, these higher frequencies may be difficult to use at higher voltages. Thus, in aspects of the present disclosure a stranded conductor is discussed which may provide high voltages at high frequencies.

In examples of the disclosure, a conductor device 38 may couple electrical load 20 to a power source 32. Conductor device 38 may have a first coupling configured to couple to power source 32 and a second coupling configured to couple to electrical load 20. Conductor device 38 may have a plurality of strands electrically disposed between the first coupling and the second coupling. These pluralities of conductors effectively reduce skin effect on each of the plurality of conductors, by dividing one single conductor into many smaller conductors, which have a radius below the skin depth of the conductor material. Additionally, each of the plurality of strands may have a coating having a resistivity greater than $1.8 \times 10^{-8}$ ohms per meter (Ω-m) and less than 1 Ω-m and a center conductor wrapped, at least in part, by the coating. The coating effectively reduces e-field stress by distributing the voltage drop more evenly with the addition of the semi-conductive strand coating.

Figure 2:
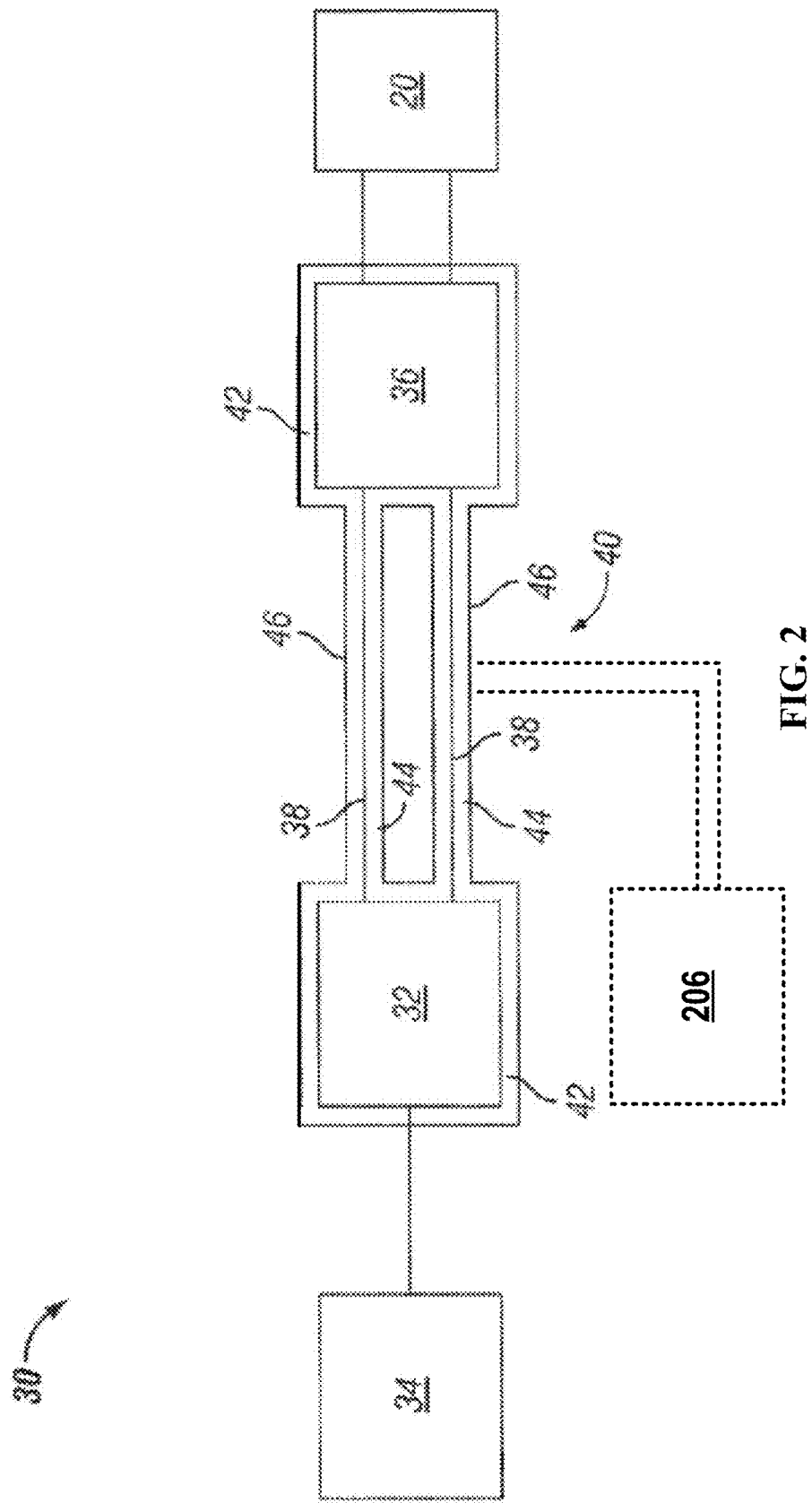
FIG. 2 is a schematic example of a system for supplying electrical power to an aircraft electrical load during flight operations of an aircraft in accordance with examples of the present disclosure.

FIG. 2 is a schematic example of a power system 30 for supplying electrical power to an aircraft electrical load 20 during flight operations of an aircraft 10 in accordance with examples of the present disclosure. Power system 30 includes a power source 32 driven by an engine 34, a voltage reducer 36, a plurality of conductors 38, and a conduit system 40. Power system 30 may be configured to generate electrical power for electrical load 20 during operations of aircraft 10. Power source 32 may be mechanically coupled to engine 34. Power source 32 may be configured to generate electrical power for electrical load 20. In one form, power source 32 is a synchronous generator. In other examples, power source 32 may be any electrical power generating machine configured to convert mechanical power into electrical power in AC and/or DC form. In an example of power system 30, battery 206 may be an alternative source of power for power system 30. Battery 206 is shown in broken line to suggest an alternative power source.

Engine 34 is coupled to power source 32 and is configured to supply mechanical power to power source 32 for conversion by power source 32 to electrical power. In one form, engine 34 is one or more propulsion engines for aircraft 10 (e.g., one or more engines 18). In other examples, engine 34 may be any engine installed in or on aircraft 10. In one form, engine 34 is a gas turbine engine. In other examples, engine 34 may be any other type of engine, such as a combustion engine.

Voltage reducer 36 is electrically coupled between conductor device(s) 38 and electrical load 20. Voltage reducer 36 is configured to reduce the voltage of the electrical power output of power source 32 to a voltage level suitable for use by electrical load 20. In one form, voltage reducer 36 is a transformer. In other examples, voltage reducer 36 may be another type of voltage reducer (e.g., a voltage divider). In still other examples, voltage reducer 36 may take one or more other forms in addition to or in place of a transformer and/or a voltage divider. Yet other examples may not include a voltage reducer such as voltage reducer 36.

Power system 30 may deliver power from a power source 32 (e.g., a generator, a battery, etc.). For larger power systems (e.g., 500 kW and above) the cable (i.e., conductor) sizes required to carry the power (e.g., at greater than 270V) become undesirably larger and heavier relative to smaller power systems. However, the transmission of electric power is typically limited to 270V due to breakdown of known electrical cable insulation caused by E-field stress. Voltages above 270V may result in corona effects, e.g., electrical discharge through the sheath or cable insulation, in some ambient conditions (e.g., lower altitudes) brought about by e-field stress. System 30 may be configured to supply electrical power at voltages greater than 270V and less than 18 kV.

Examples of the present disclosure may be directed to conductor 38 which allows for voltages, including high voltages, to be efficiently moved along conductor 38 at high frequencies. Conductor 38 efficiently moves high voltages (e.g., above 270V) from power source 32 to electrical load 20 at a high frequency (e.g., up to 10 MHz). Conductor 38 may have a resistance at or substantially near 1 for frequencies up to 10 MHz. Conductor 38 may operate at voltages at or above 270 volts and be resistive to E-field stress through a semi-conductive coating at least partially covering strands within conductor 38. Thus, allowing conductor 38 to handle voltages of 270 volts and greater at frequencies up to 10 MHz. Conductor 38, further, may mitigate skin effect of the conductor 38 at frequencies up to 10 MHz through more than one conductor element traversing along conductor 38.

Conductor device(s) 38 are electrically disposed between power source 32 and voltage reducer 36. Conductor device (s) 38 are configured to conduct electrical power between power source 32 and electrical load 20. In one form, conductor device(s) 38 are configured to conduct electrical power between power source 32 and electrical load 20 via voltage reducer 36. In other examples, conductor device(s) 38 may be directly coupled to electrical load 20. In some instances, voltage reducer 36 may be positioned some distance from power source 32 (e.g., adjacent to electrical load 20) and hence, the length of conductor device(s) 38 may vary with the needs of the application.

In general, the present disclosure is directed to a conductor device(s) 38 which may operate efficiently at high voltages and high frequencies. Conductor device(s) 38 may enable efficient operation in environments including high altitudes or other harsh environments in which the natural insulation provided by air is reduced. To operate in harsh conditions and to address harmful effects such as skin effect and e-field stress, conductor device(s) 38 may terminate in a high voltage coupling coupled to power source 32 and with another high voltage coupling configured to couple to electrical load 20. Conductor device(s) 38 may have several strands electrically disposed between power source 32 and load 20, where each of the plurality of strands may include a coating having a resistivity greater than $1.8 \times 10^{-8}$ Ω-m and less than 1 Ω-m and a center conductor wrapped by a coating. These aspects of the present disclosure for a stranded conductor device 38 are discussed which may provide high voltages at high frequencies in harsh environments.

Figure 3:
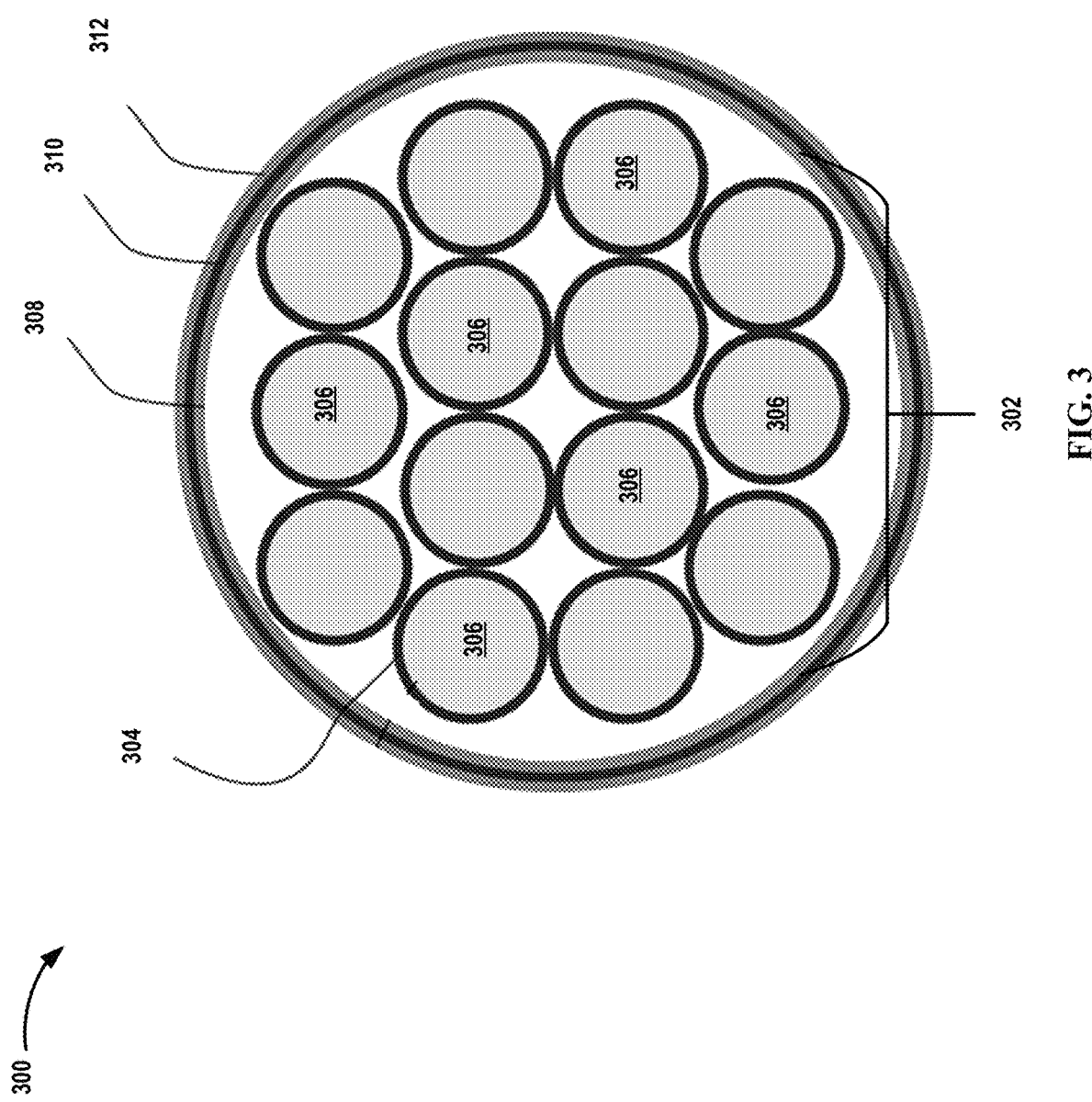
FIG. 3 is a cross-section view of a conductor device in accordance with examples of the present disclosure.

FIG. 3 is a cross-section view of a conductor device 300 in accordance with examples of the present disclosure. Conductor device 300 may be a conductor similar to conductor device(s) 38 and may be coupled to electrical load 20 and to power source 32. Each of strands 302 may have a coating 304 having a resistivity greater than $1.8 \times 10^{-8}$ Ω-m and less than 1 Ω-m and a center conductor 306 wrapped, at least in part, by coating 304.

Conductors 306 may be most any electrically conducting material, such as copper. Conductors 306 may have a resistivity between $1.8 \times 10^{-10}$ Ω-m to $1.8 \times 10^{-6}$ Ω-m, however, most any conductor may be used, but the lower the resistivity within the conductor, the more efficient the power transfer between power source 32 and load 20. Most of conductors 306 used in electronics are metals like gold, copper, aluminum and steel. Conductors are materials having a very low resistance. They may therefore carry electric currents between a power source and a power load without dissipating a lot of power. Bundle insulation 308 may have a resistivity greater than $1 \times 10^{10}$ Ω-m and may wrap strands 302. Semi-conductive coating 310 may have a resistivity greater than $1.8 \times 10^{-8}$ Ω-m and less than 1 Ω-m and may be wrapped, at least in part, around bundle insulation 308. EMI shield 312 may wrap, at least in part, around second semi-conductor coating 310. Conductor device 300 may be used with voltages over 270V and at frequencies up to 10 MHz by minimizing the harmful effects of skin effect and e-field stress.

Transferring high voltage power through power system 30 at low frequencies (e.g., 0-60 Hz) typically may be performed without many issues. However, the confluence of high frequency (e.g., >1 KHz) with high voltage (e.g., >270V) pose new issues (e.g., skin effect becomes a greater issue as the frequency increases). Further, as air density decreases (i.e. with increasing altitude) issues with e-field stress increase (e.g., less air leads to reduced insulation and thus a greater chance of insulation breakdown at high voltages).

High frequencies may also cause issues within conductor device 300, through skin effect. Skin effect is the tendency of electricity to not be evenly distributed within conductor 306 as frequencies increase. Typically, at DC (which may be denoted as 0 Hertz (Hz)) electricity will flow evenly across the cross section of conductor 306. This spreads the resistivity of conductor 306 across the entire cross-sectional area. However, as frequencies increase this cross-sectional area decreases as electricity may traverse along the surface of conductor 306 rather than penetrate deeper into the conductive element. As this cross-sectional area decreases, the resistivity of the conductor increases (given that less area conveys the electrical current). As resistivity increases, heat may be generated. This heat may breakdown insulation material which has traditionally been used on conductors utilized for high voltage applications.

The skin effect causes the effective resistance of the conductor to increase at higher frequencies where the skin depth is smaller, thus reducing the effective cross-section of the conductor. The skin effect is due to opposing eddy currents induced by the changing magnetic field resulting from the alternating current. At 60 Hz in copper, the skin depth is about 8.5 mm. At high frequencies the skin depth becomes much smaller.

Conductor device 300 may reduce the skin effect at voltages above 270V and above 100 Hz by utilizing a Litz construction. Litz wire is a special type of multistrand wire or cable used in electronics to carry alternating current (AC). Conductor device 300 may have several conductors 306 twisted or woven together. The result of these winding patterns has the effect of distributing the current equally among conductors 306, effectively reducing the resistance of conductor device 300 allowing conductor device 300 to operate at higher frequencies.

As discussed, high voltages may cause issues with E-field stress. E-field stress is the stress endured by insulator materials when exposed to high voltage electrical fields. Although air is normally an excellent insulator, when stressed by a sufficiently high voltage (e.g., an electric field of about $3 \times 10^6$ V/m or 3 kV/mm), air may begin to break down, becoming partially conductive. Across relatively small gaps, breakdown voltage in air is a function of gap length times pressure. If the voltage is sufficiently high, complete electrical breakdown of the air will culminate in an electrical spark or an electric arc bridging the entire gap and causing severe damage to the conductor and nearby equipment.

Conductor device 300 may reduce the E-field stress by utilizing a semi-conductive coating 304 at least partially wrapped around each strand 306. The term semi-conductive does not mean the semi-conductive coating material 304 is a semi-conductor, but rather a material with a lower resistivity in between a conductor and an insulator.

Semi-conductor insulation may be made by polluting an insulator with carbon powder. For comparison, the resistivity of materials are listed below in Table 1. The semi-conductive layer is eight orders of magnitude less conductive than copper, while a polyimide insulation, commonly used as insulation in electrical conductors, is twenty-one orders of magnitude less conductive. Coating material 304 may have a resistivity of between $1 \times 10^2$ Ω-m to $1 \times 10^2$ Ω-m; however, the lower the resistivity, the more the material will act as a conductor and the higher the resistivity, the more the material will act as an insulator. The coating material 304 may be polyimide insulation mixed with carbon to meet the desired resistivity.

Conductor(s) 302 reduce the e-field stress at each conductor through the use of the semi-conductive coating 304. Traditional polyimide strand insulation is not desirable at high voltage. Polyimide has a high resistivity, which creates sharp discontinuities in the voltage drop, concentrating E-field stress at the conductor interfaces. The localized E-field stress may produce partial discharges, which over time may damage the insulation system and result in arcing and catastrophic failure.

Coating material 304, having a substantially lower resistivity acts to reduce stress concentrations in the E-field. Thus, partial discharge activity and damage to the insulation layer 308 is substantially reduced.

TABLE 1

| Resistivity of High Voltage Cable Materials | |
|---|---|
| Material | Resistivity |
| Copper | $1.8 \times 10^{-8}$ Ω-m |
| Semi-conductive Layer | $<1 \times 10^0$ Ω-m |
| Polyimide Insulation | $>1 \times 10^{13}$ Ω-m |

Thus, through the use of a Litz construction for conductor device 300, skin effect may be reduced, thus allowing for higher frequencies to be transferred along conductor device 300. Further, a semi-conductive coating material 304, higher voltages may also be transferred along strands 306. Several analyses were run to show the effectiveness of conductor device 300. The results of these analyses are shown below in the discussion of FIGS. 4 and 5.

Figure 4:
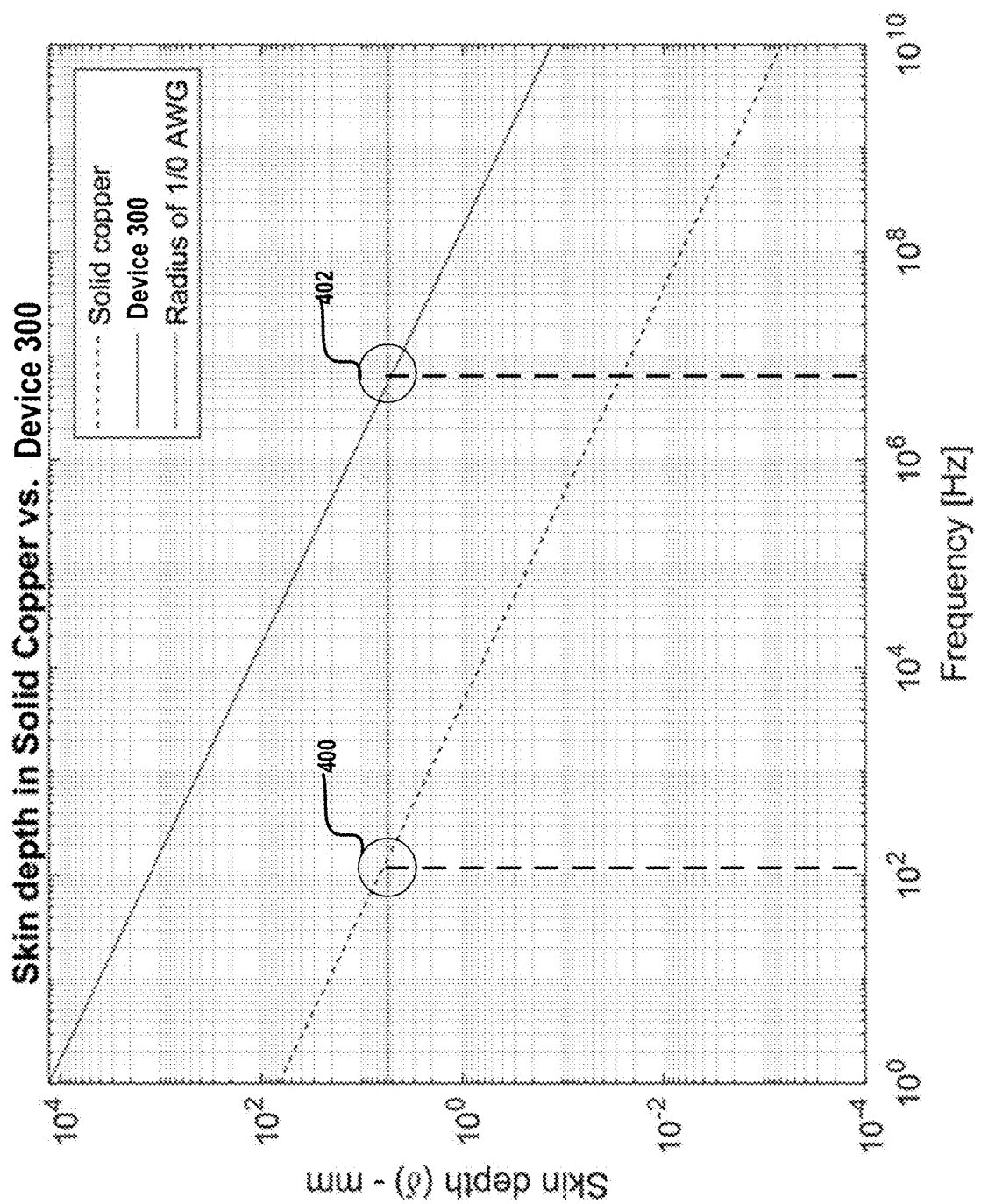
FIG. 4 is a graph comparing skin depth of a solid copper conductor vs. a conductor device in accordance with examples of the present invention.

FIG. 4 is a graph comparing skin depth of a solid copper conductor vs. conductor device 300 in accordance with examples of the present invention.

A solid copper conductor with a radius of 1/0 AWG (American wire gauge) is useful up to about 100 Hz; represented by circle 400. This is severely limiting to high frequency systems operating at 1 kHz or above. In comparison, conductor device 300 does not lose performance until well above 1 MHz (e.g., approximately 10 MHz), represented by circle 402, which is much greater than any high-voltage frequency. This fact is further illustrated in FIG. 5, which clearly illustrates the frequency break point in effectiveness for a 1/0 AWG conductor.

Figure 5:
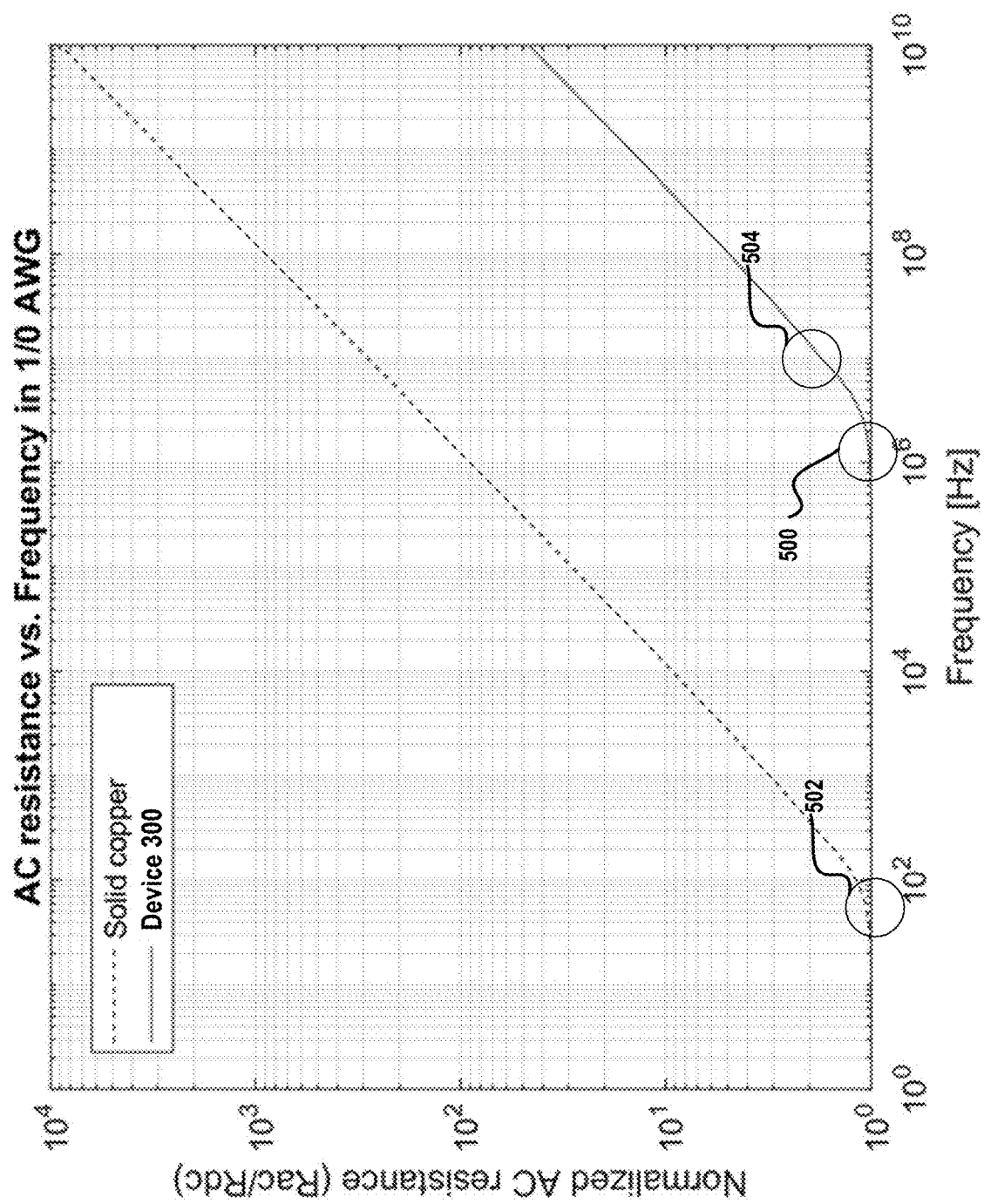
FIG. 5 is a graph comparing AC resistance vs. frequency in both a solid copper conductor and a conductor device in accordance with examples of the present invention.

FIG. 5 is a graph comparing AC resistance vs. frequency in both a solid copper conductor and conductor device 300 in accordance with examples of the present invention. A normalized AC resistance comparison of conductor device 300 versus a solid copper wire. A resistance factor of unity (i.e., Rac/Rdc=$10^0$=1) indicates a conductor 302 has the same power loss at a frequency (XHz; where X may be a frequency greater than 0) as it does at DC (0 Hz). It is ideal to keep a conductor's resistance factor substantially as close to one as possible in order to limit losses. This means the resistivity of conductor 302 remains substantially the same at higher frequencies as is does at DC. At a resistance factor of 1, skin effect is not an issue and losses are minimal. For purposes of this disclosure the term "substantially" when used in relation to describing elements, shall be defined as being largely and or wholly the item specified. When used in relation to quantities, it may mean considerable in quantity; significantly great.

A resistance factor greater than 1, such as 2× implies a power loss 2× that of the DC resistance (i.e., power=current$^2$*resistance). Therefore, it is helpful to keep the resistance factor close to unity, which conductor device 300 maintains until ~1 MHz, represented by circle 500. Whereas solid copper only maintains unity resistance factor until approximately 100 Hz represented by circle 502. Further, conductor device 300 still has a resistance factor close to 1.75 up to 10 MHz, represented by circle 504.

Yet another advantage of the Litz construction is the ability to shape conductor device 300 is other shapes besides circular. Space constraints may be an issue on aircraft 10 as well as other vehicles. The ability to efficiently route and store conductors may be an issue.

Figure 6:
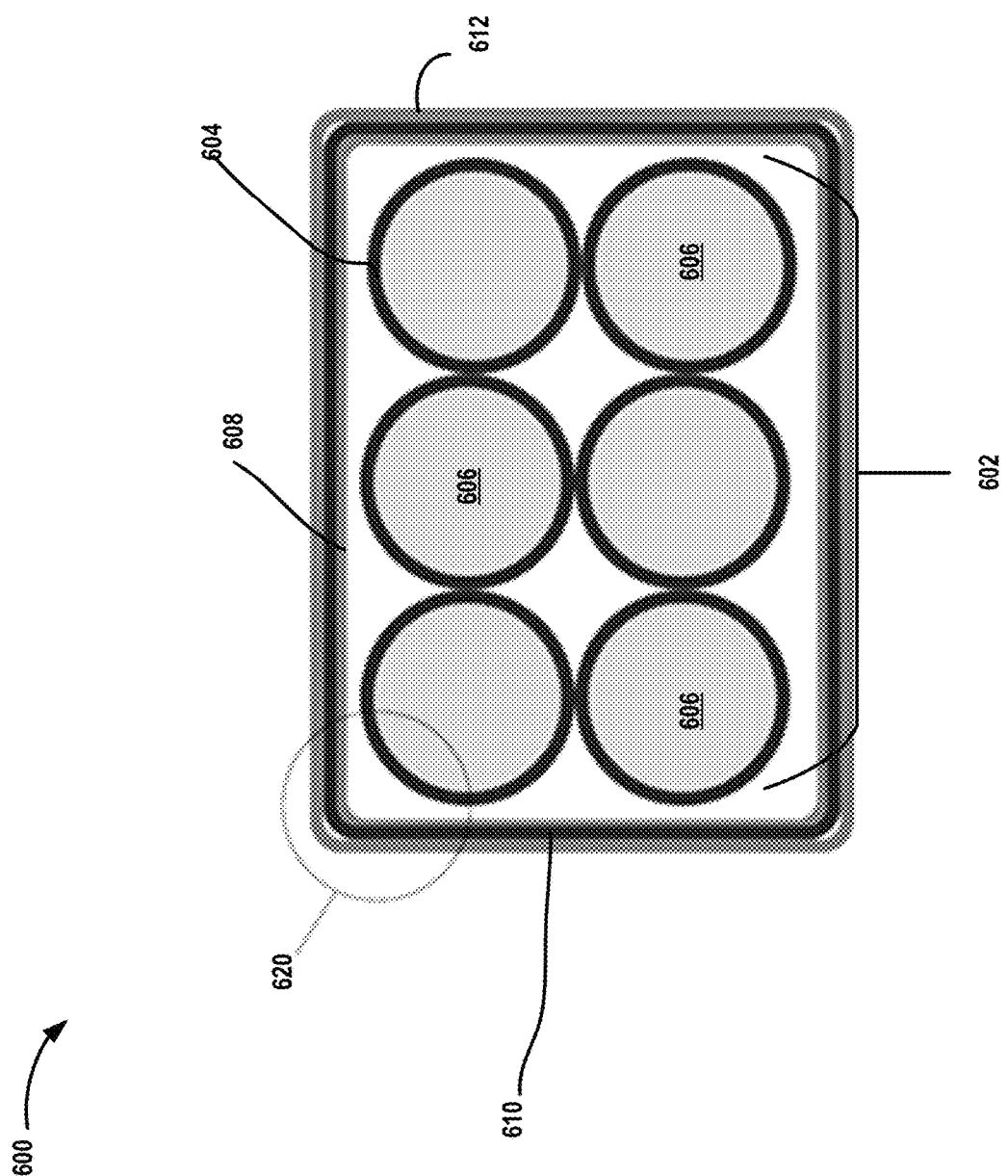
FIG. 6 is a cross-section view of a conductor device in accordance with example of the present invention.

FIG. 6 is a cross-section view of a conductor device 600 in accordance with example of the present invention. Device 600 may be a conductor similar to conductor device 300 and conductor device 38 and may be coupled to electrical load 20 and to power source 32. Litz wire can be pre-formed in rectangular cross-sections, which boosts the packing factor for rectangular winding windows such as in electrical machines and other power devices. However, sharper edges 620 of a rectangular conductor device 600 may also boost the e-field concentrations, making it more susceptible to breakdown. Semi-conductor 604 wrapped around conductor 606 and semi-conductor 610 wrapped around strands 602 provide for a reduced e-field concentration as discussed above.

Figure 7:
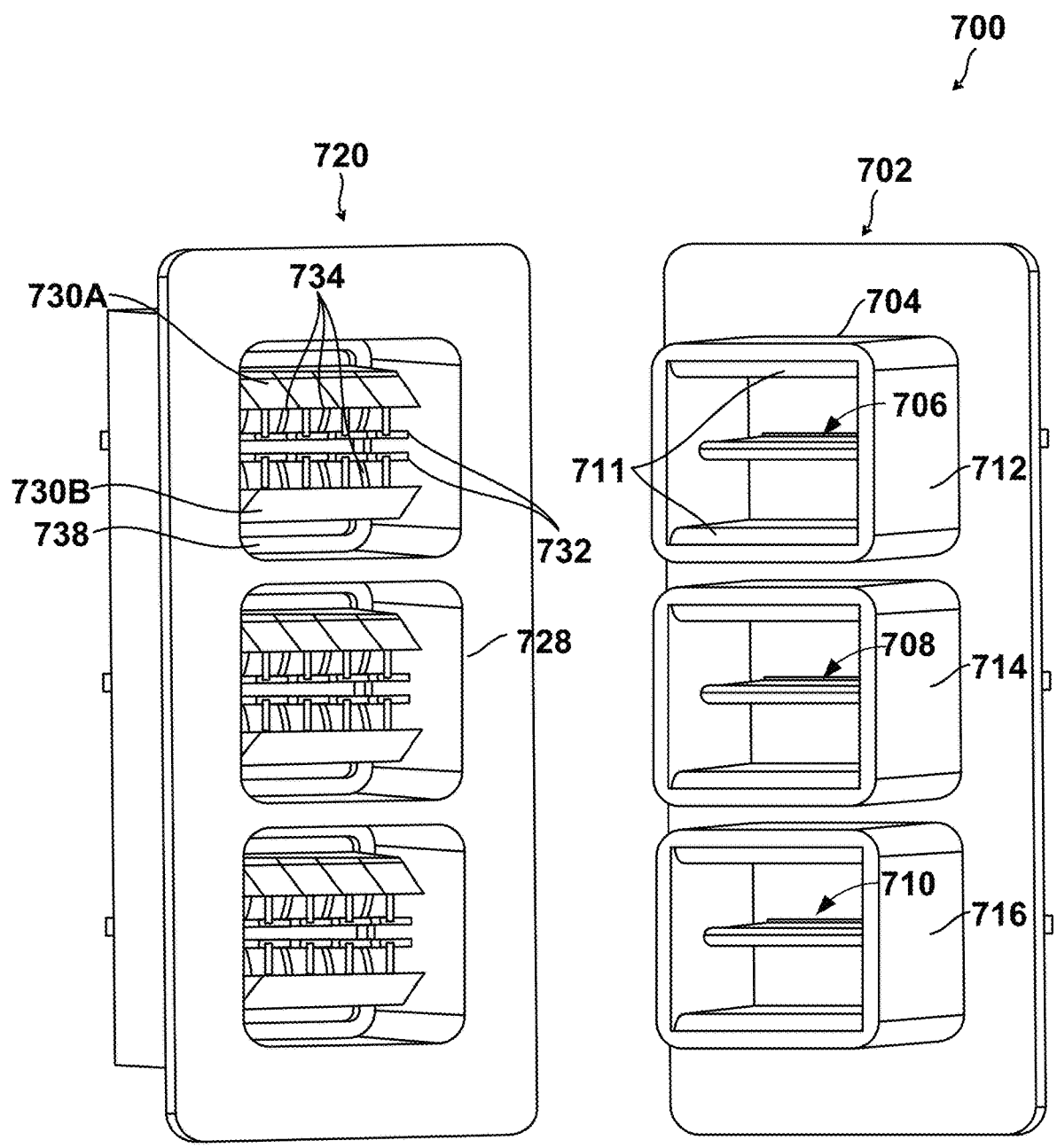
FIG. 7 is a conceptual diagram illustrating the high voltage coupling system according to one or more techniques of this disclosure.

Conductor device 600, may be pre-formed in rectangular cross-sections or matrixes, which boost a packing factor for rectangular winding windows such as in electrical machines, other power devices and for high-voltage couplings 700 (FIG. 7). The use of the conductor device 600 solution allows robust manufacture of pre-formed rectangular conductor devices 600 for high voltage applications. As the requirement for lighter and lighter vehicles grows, the packing factor will become more relevant. Thus, the greater the area which may be conserved, the better in most vehicle applications. Another issue not often discusses with high frequencies, but address with high voltages is couplers which may handle high voltages.

FIG. 7 is a conceptual diagram illustrating a high voltage coupling system according to one or more aspects of the techniques of this disclosure. The high voltage coupling system is also the subject of a co-owned application, U.S. Patent Application No. 62/913,610, titled ELECTRICAL CONNECTION DEVICES FOR HIGH POWER APPLICATIONS, filed on Oct. 10, 2019 and is herein incorporated by reference in its entirety.

A high-power electrical coupling 700 may be configured for blind mounting and providing an environmental sealing connector with bus bar interfaces featuring positional alignment and low friction mating. While high power electrical coupling 700 is discussed, a coupling may be any termination point at each end of conductor device 300. In some examples, receptacle coupling 702 may include multiple isolated bus bar interfaces 706, 708 and 710 such as for a three-phase power connection. Bus bar interfaces 706, 708 and 710 may be coupled, each to conductor device 600, 300 or 38, for each of bus interfaces 706, 708 and 710. Bus bar 706, 708 and 710 may be electrically isolated from any nearby connectors. Plug coupling 720 configured to mate with receptacle coupling 702. Each plug coupling 720 may include several electrical contacts 732 configured to make an electrical connection to bus bars 706, 708 and 710 in receptacle coupling 702, when mated. A tensioning device 730A and 730B (collectively tensioning devices 730) for each electrical contact 732 may apply a spring force to contact 732. Tensioning device 730 may include a compression bar. When not mated (or, in other words, when in a free state), tensioning device springs 734 may force the hinged compression bar to angle upward, placing electrical contacts 732 in position for mating with bus bar 706, 708, 710.

Receptacle coupling 702 may include friction pads 711, which may compress tensioning device 730A and 730B (collectively tensioning devices 730) onto contacts 732 when mated. When plug coupling 720 is mated to receptacle coupling 702 and fully seated, friction pads 711 cause the compression bars to lower and apply a force to electrical contacts 732 via springs 734. Shell cowling 704 of receptacle coupling 702 may be configured to compress against an environmental gasket 738 at the base of plug cavity 728 to prevent the ingress of debris, fluids, etc., possibly impacting the electrical conduction or create a shorting path. During mating of plug coupling 720 to receptacle coupling 702, the compression of electrical contacts 732 of plug coupling 720 to incoming bus bar 706, 708, 710 of receptacle coupling 702 may be accomplished at approximately a half-way point along contacts 732 and bus bar 706, 708 and 710. For the second half of the mating, electrical contact 732 slides along the surface of bus bar 706, 708, 710, under compression, thereby potentially removing build-up on bus bar 706, 708, 710, such as corrosion or contact debris. In this manner electrical contacts 732 connect bus bar 706, 708, 710 in plug coupling 720 to bus bar 706, 708, 710 in receptacle coupling 702. Electrical contacts 732 are sized and positioned to match the bus bar geometry for balanced current flow and to avoid interface internal heating.

Conductor device 600, 300 and or 38 could be coupled to either receptacle coupling 702 or plug coupling 720. However, power source 32 and/or load 202 would have to have the mating coupling to receptacle coupling 702 or plug coupling 720. For example, if conductor device 600 has a receptacle coupling 702 at each end of conductor device 600, then power source 32 and load 202 would need plug coupling 720 to make a proper connection.

Figure 8:
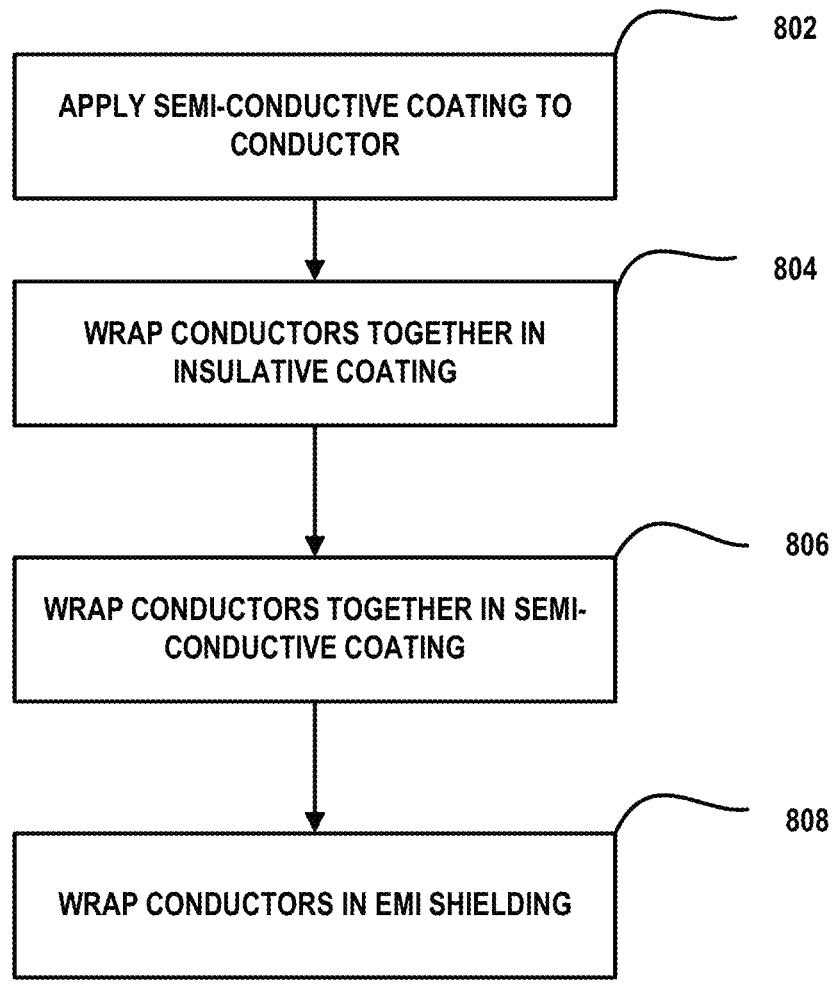
FIG. 8 is a flow diagram of a method for making a conductor device in accordance with one or more techniques of this disclosure.

FIG. 8 is a flow diagram of a method for making a conductor device in accordance with one or more techniques of this disclosure. In process 800, one or more conductors 306 can be coated with a semi-conductive coating 304 (802), which helps mitigate e-field stress at high voltages. Semi-conductive coating 304 may have a resistivity of $1\times10^0$ Ω-m but could have a range between $1\times10^4$ Ω-m to $1\times10^2$ Ω-m. Two or more conductors can be grouped and wrapped in an insulative coating 308 together (804). Insulative coating 308 may be a coating similar to Polyimide insulation having a resistivity of $1\times10^{13}$ Ω-m.

Insulative coating 308 may be coated with another semi-conductive coating 310 (806). Like semi-conductive coating 304, semi-conductive coating 310 may have a resistivity of $1\times10^0$ Ω-m but could have a range between $1\times10^4$ Ω-m to $1\times10^2$ Ω-m. An EMI shield 312 may be wrapped around semi-conductive coating 312 to provide electromagnetic shielding for conductor device 300 (808). Various examples have been described. These and other examples are within the scope of the following claims.

What is claimed is:

1. A device configured to couple an electrical load to a power source, the device comprising:
a first coupling configured to couple to the power source;

a second coupling configured to couple to the electrical load; and a plurality of strands electrically disposed between the first coupling and the second coupling and configured to carry voltages above 270 volts at frequencies up to 10 mega-Hertz while maintaining a resistance substantially near one ohm for frequencies up to 10 mega-Hertz, each of the plurality of strands including:

a coating having a resistivity greater than $1.8 \times 10^{-8}$ ohms per meter ($\Omega$-m) and less than 1 $\Omega$-m; and a center conductor wrapped, at least in part, by the coating.

2. The device of claim 1, wherein the plurality of strands is bundled together in a matrix.

3. The device of claim 1, wherein a resistance factor of the center conductors of the plurality of strands is between 1.0 and 1.1 from 0 Hz to 1 MHz.

4. The device of claim 1, further comprising a bundle insulation having a resistivity greater than $1 \times 10^{10}$ $\Omega$-m, and the plurality of strands, at least in part, wrapped by the bundle insulation.

5. The device of claim 4, further comprising a second coating having a resistivity greater than $1.8 \times 10^{-8}$ $\Omega$-m and less than 1 $\Omega$-m wrapped, at least in part, around the bundle insulation.

6. The device of claim 5, further comprising an electromagnetic induction (EMI) shield wrapped, at least in part, around the second coating.

7. The device of claim 1, wherein the resistivity of the plurality of strands is between $1.8 \times 10^{-6}$ $\Omega$-m to $1.8 \times 10^{-10}$ $\Omega$-m.

8. A system for supplying power to an electrical vehicle load during vehicle operations of a vehicle, comprising:

an engine mounted in or on the vehicle;

a power source coupled to the engine and configured to generate electrical power at a voltage above 270 volts for the vehicle electrical load during operations of the vehicle;

a first coupling configured to couple to the power source;

a second coupling configured to couple to the vehicle electrical load; and a plurality of strands electrically disposed between the first coupling and the second coupling and configured to carry voltages above 270 volts at frequencies up to 10 mega-Hertz while maintaining a resistance substantially near one ohm for frequencies up to 10 mega-Hertz, each of the plurality of strands including:

a coating having a resistivity greater than $1.8 \times 10^{-8}$ $\Omega$-m and less than 1 $\Omega$-m; and a center conductor wrapped, at least in part, by the coating.

9. The system of claim 8, wherein a resistance factor of the center conductors of the plurality of strands is between 1.00 and 1.75 from 0 Hz to 10 MHz.

10. The system of claim 8, further comprising a bundle insulation having a resistivity greater than $1 \times 10^{10}$ $\Omega$-m, and the plurality of strands, at least in part, wrapped by the bundle insulation.

11. The system of claim 10, further comprising a second coating having a resistivity greater than $1.8 \times 10^{-8}$ $\Omega$-m and less than 1 $\Omega$-m wrapped, at least in part, around the bundle insulation.

12. The system of claim 11, further comprising an electromagnetic induction (EMI) shield wrapped, at least in part, around the second coating.

13. The system of claim 8, wherein the resistivity of the plurality of strands is between $1.8 \times 10^{-6}$ $\Omega$-m to $1.8 \times 10^{-10}$ $\Omega$-m.

14. The system of claim 8, wherein the plurality of strands is bundled together in a rectangular cross section.

15. An aircraft, comprising:

a wing;

a fuselage coupled to the wing;

an engine coupled to the fuselage and the wing;

an electrical load of a high energy device associated with the aircraft during flight operations;

a power source coupled to the engine and configured to generate electrical power at a voltage above 270 volts for the electrical load of the high energy device during flight operations; and a first coupling configured to couple to the power source;

a second coupling configured to couple to the aircraft electrical load; and a plurality of strands electrically disposed between the first coupling and the second coupling and configured to carry voltages above 270 volts at frequencies up to 10 mega-Hertz while maintaining a resistance substantially near one ohm for frequencies up to 10 mega-Hertz, each of the plurality of strands including:

a coating having a resistivity greater than $1.8 \times 10^{-8}$ $\Omega$-m and less than 1 $\Omega$-m; and a center conductor wrapped, at least in part, by the coating.

16. The aircraft of claim 15, wherein the plurality of strands is, at least partially, within a bundle insulation having a resistivity greater than $1 \times 10^{10}$ $\Omega$-m.

17. The aircraft of claim 16, wherein the bundle insulation is wrapped, at least partially, within a semi conductive layer which has a resistivity greater than 0.000000018 $\Omega$-m and less than 1 $\Omega$-m.

18. The aircraft of claim 17, wherein the semi conductive layer is, at least partially, within an EMI shield.

19. The aircraft of claim 15, wherein the resistivity of the plurality of strands is between $1.8 \times 10^{-6}$ $\Omega$-m to $1.8 \times 10^{-10}$ $\Omega$-m.

20. The aircraft of claim 15, wherein the plurality of strands is bundled together in a rectangular cross section.

* * * * *